S. G. CRANE.
ELECTRIC AUTOMATIC SCALE.
APPLICATION FILED MAR. 4, 1915.
1,328,320.
Patented Jan. 20, 1920.
4 SHEETS—SHEET 1.
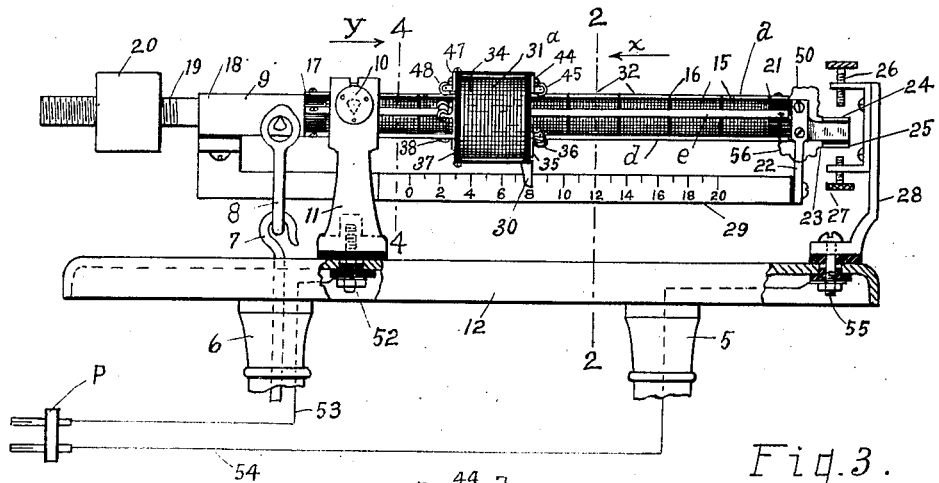
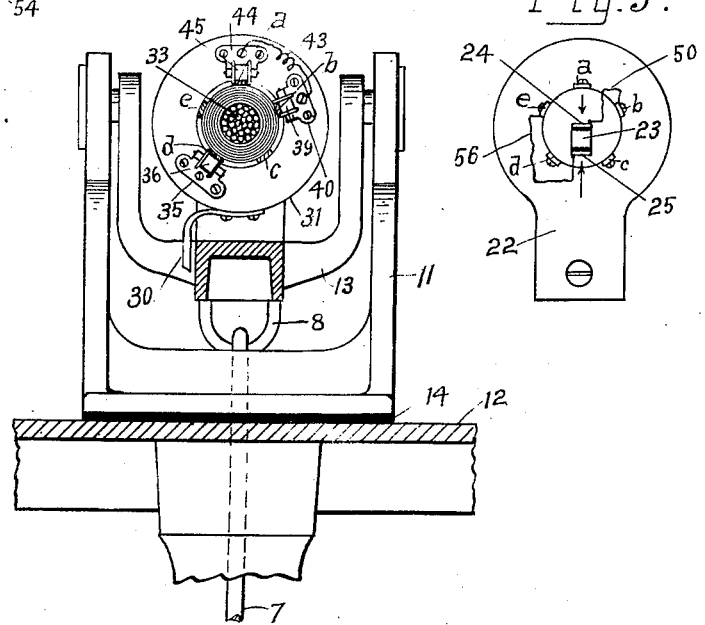
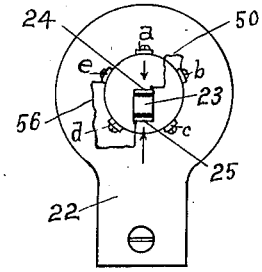
WITNESSES:
D. C. Walter
Carl Pinke
INVENTOR.
Samuel G. Crane
BY George R. Frye
ATTORNEY S. G. CRANE.
ELECTRIC AUTOMATIC SCALE.
APPLICATION FILED MAR. 4, 1915.
1,328,320.
Patented Jan. 20, 1920.
4 SHEETS—SHEET 2.
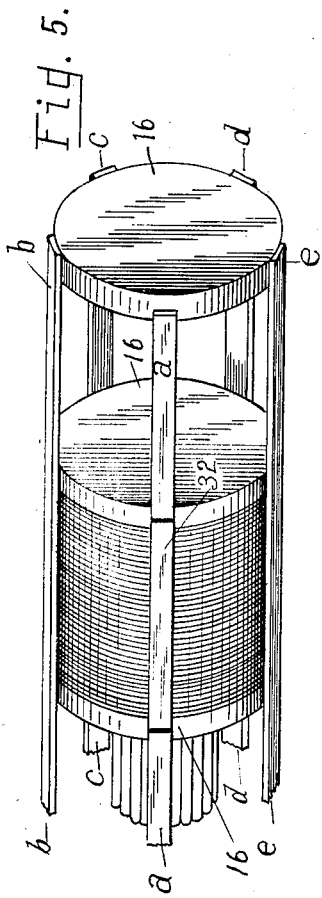
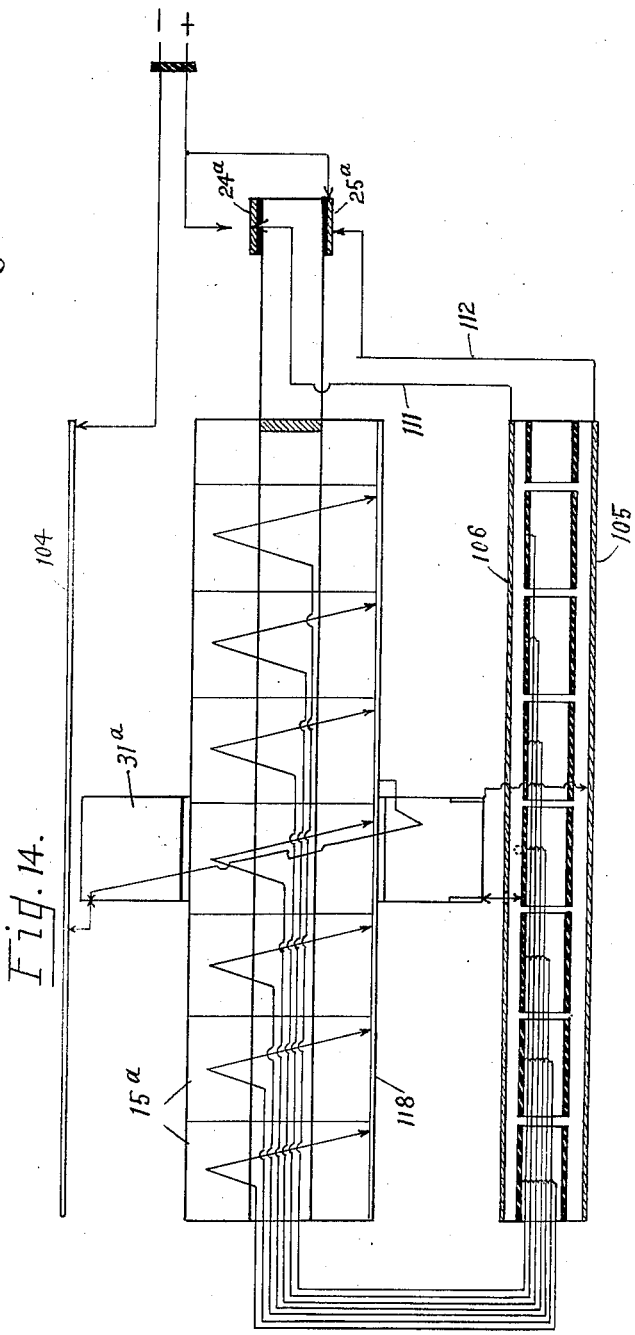
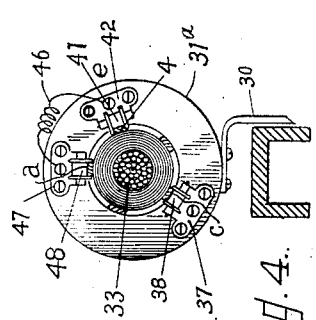
WITNESSES:
D. C. Walter
Carl Finkel
INVENTOR.
Samuel G. Crane
BY George R. Frye
ATTORNEY

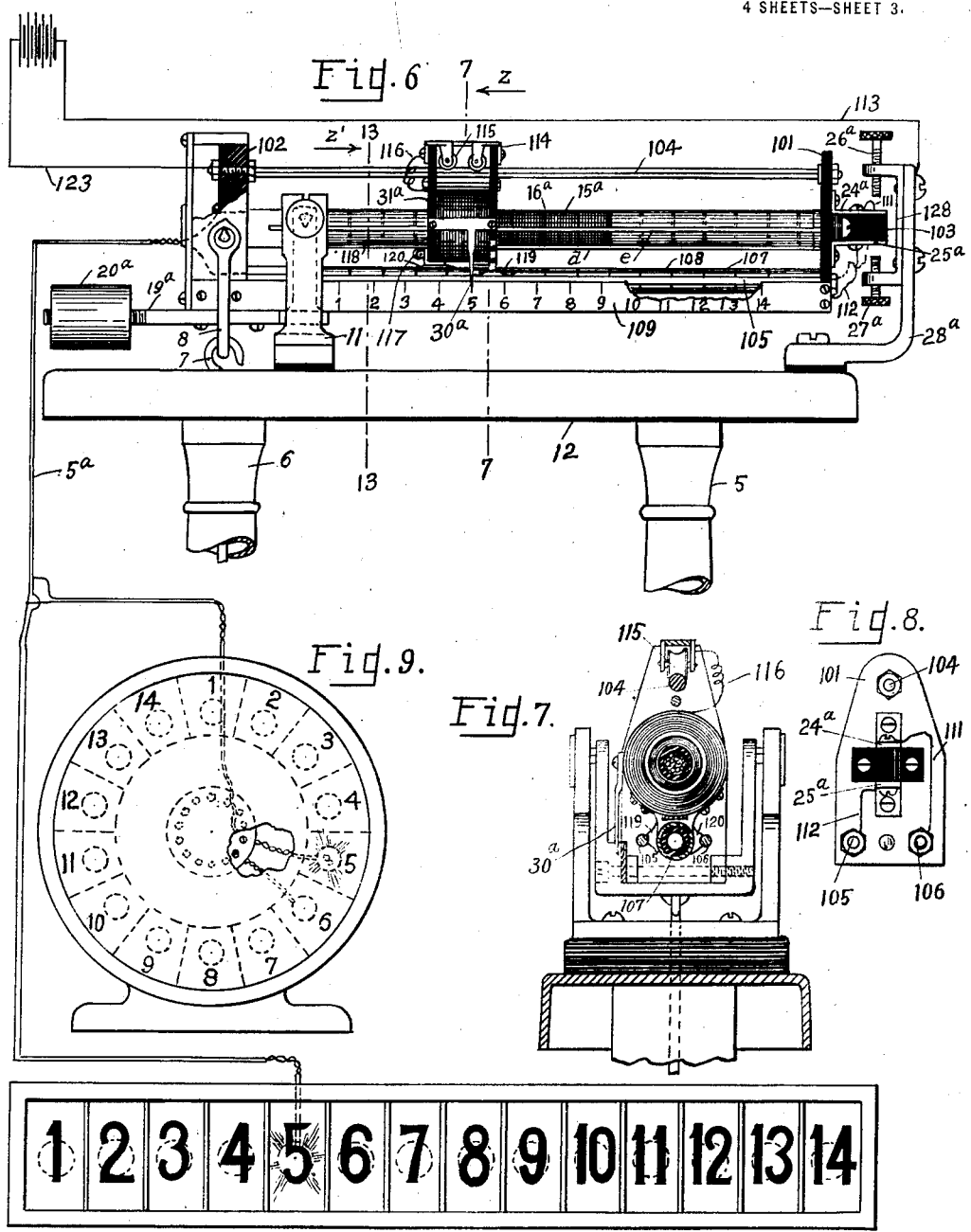

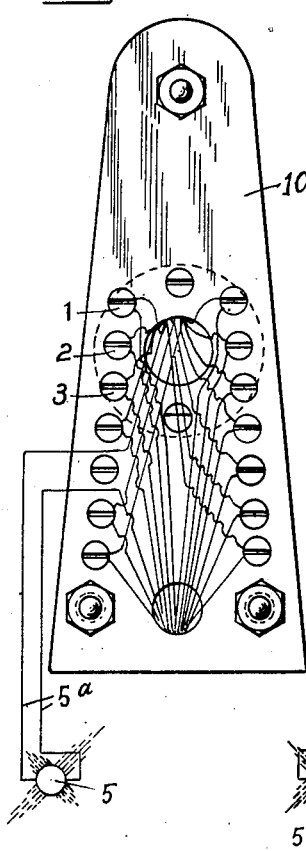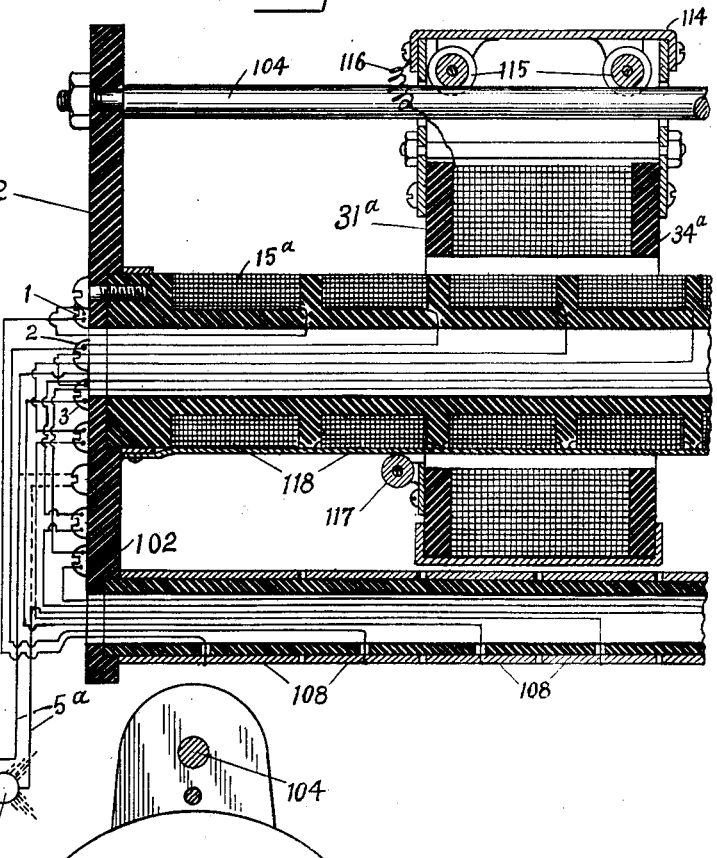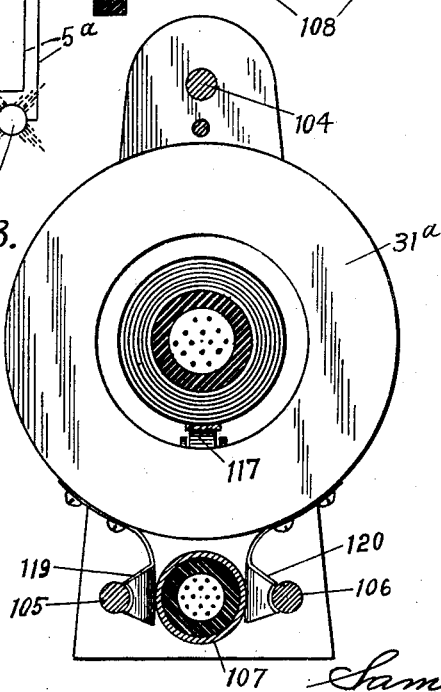

UNITED STATES PATENT OFFICE.

SAMUEL G. CRANE, OF TOLEDO, OHIO, ASSIGNOR TO TOLEDO SCALE COMPANY, OF TOLEDO, OHIO, A CORPORATION OF OHIO.

ELECTRIC AUTOMATIC SCALE.

1,328,320.  Specification of Letters Patent.  Patented Jan. 20, 1920.

Application filed March 4, 1915. Serial No. 11,967.

*To all whom it may concern:*

Be it known that I, SAMUEL G. CRANE, residing at Toledo, in the county of Lucas and State of Ohio, have invented new and useful Improvements in Electric Automatic Scales, of which the following is a specification.

This invention relates to electric automatic weighing scales, and more particularly to that class of beam scales in which a poise for counter-balancing or offsetting the load upon the scale platform is automatically moved along the scale beam until equilibrium is established.

The primary object of my invention is to provide an electric automatic scale with electrically-operated poise mechanism whereby the weight of an article or articles placed upon the scale platform is readily and accurately indicated by the automatic movement of the poise along the scale beam.

Another object of this invention is to provide electrically-actuated automatic means for moving the poise along the scale beam until the beam is balanced, the current to energize the electric automatic means being under the control of the movement of the scale beam.

A further object of this invention is to provide a scale employing a novel form of beam embodying a series of solenoid coils arranged to co-act with a poise that is automatically movable upon the scale beam and governed in its movements thereon by electric connections and mechanisms under the control of the movement of the beam.

A further object of this invention is to provide in connection with electric automatic scales of the character above set forth means for indicating at various distances from the scale proper the weights of articles weighed upon the scale.

With the above and other objects in view which will more readily appear after the invention is better understood, this invention consists in the novel construction, combination, and arrangement of parts to be hereinafter more fully described and particularly pointed out in the subjoined claims.

Reference is to be had to the accompanying drawings, illustrating preferred embodiments of my invention by way of exemplification, and wherein similar reference numerals designate parts throughout the several views.

In the drawings:—

Figure 1 is a front elevation with portions broken away of the upper portion of a scale embodying my invention and showing the poise at the position along the scale beam required to counter-balance a load of 8 pounds upon the platform of the scale.

Fig. 2 is a transverse sectional view on the line 2—2 of Fig. 1 taken in the direction of the arrow X.

Fig. 3 is a detail elevation of the forward end of the scale beam shown in Fig. 1.

Fig. 4 is a transverse detail view taken substantially on the line 4—4 of Fig. 1 looking in the direction of the arrow Y.

Fig. 5 is an enlarged fragmentary perspective view of the scale beam employed in Fig. 1, the beam being shown at right angles to its position in Fig. 1.

Fig. 6 is a front elevation, partly in section, of the upper portion of a scale employing another embodiment of my invention, and particularly designed for use with indicating devices located at a distance from the scale proper.

Fig. 7 is a transverse sectional view taken substantially on the line 7—7 of Fig. 6 looking in the direction of the arrow Z.

Fig. 8 is a detail elevation of the forward end of the scale beam shown in Fig. 6.

Fig. 9 is an elevation of one form of indicating device that may be employed in connection with this invention.

Fig. 10 is an elevation of another form of indicating device that may also be employed.

Fig. 11 is an enlarged elevation of the rear end of the scale beam shown in Fig. 6.

Fig. 12 is an enlarged longitudinal section through a portion of the scale beam and poise.

Fig. 13 is an enlarged sectional view taken substantially on the line 13—13 of Fig. 6 looking in the direction of the arrow Z', and Fig. 14 is a diagrammatic view of the electric wiring system utilized in the modification shown in Fig. 6.

The embodiment of my invention shown in Figs. 1–5 inclusive will now be described.

The reference numeral 5 designates the framework of the scale, which may be of any desired type, and preferably comprises the columns 6 supported upon a base (not shown) inclosing the platform lever mechanism (not shown), which is suitably connected, as by means of the hook-rod 7 and the U-shaped yoke 8, with the scale beam 9 of the scale. The scale beam 9 as herein shown is fulcrumed intermediate its ends, as at 10, upon the bracket 11 carried by the crossbar 12 secured upon the columns 6 of the framework of the scale, a U-shaped supporting member 13 resting upon suitable bearings carried by the bracket 11 and being connected to the scale beam, substantially as shown in Fig. 2. The bracket 11 is insulated from the crossbar 12 of the scale by the insulating block 14. The beam 9 comprises a long arm formed of a longitudinal series of solenoid coils 15 insulated from each other by the blocks 16 of fiber, rubber or other insulating material, on one side of its pivotal point 10, the insulating block 17 spacing the end coil of the series adjacent the pivotal point of the beam from the short arm 18 of the scale beam upon which is suitably arranged a threaded member 19 adapted to receive the sealing weight 20 for adjustment relatively to the fulcrum of the beam in the usual manner. The insulating block 21 adjacent the end coil 15 of the series spaces the forward end of the series from the plate 22 carrying the nose 23 of the beam, which is arranged in longitudinal alinement with the series of coils 15 and carries upper and lower contact pieces 24 and 25 respectively arranged to engage the upper and lower contact screws 26 and 27 secured to, but insulated from, the upright arm of the bracket 28. The base of the bracket 28 is secured to, but insulated from, the crossbar 12 of the scale, as clearly shown in Fig. 1.

A lower rod 29 suitably inscribed with weight graduations adapted to co-act with the index or pointer 30 depending from the poise 31 in indicating the weights of articles placed upon the scale platform is secured to and insulated from the plate 22 and the arm 18 of the scale beam by means of screws or other suitable fastening devices.

Arranged in longitudinal alinement above the coils 15 and forming a sectional commutator strip $a$, are a series of separated contact members 32, the ends of the several contact members 32 being preferably connected to the insulating blocks 16 between the solenoid coils to aid in their insulation from each other. One end of the wire forming each solenoid coil 15 is connected to the contact member 32 directly above the coil. The other end of the wire forming each of the solenoid coils 15 is connected to the longitudinal conducting strip $d$, which strip is adapted to serve as a common conducting member to all of the solenoid coils embodied in the scale beam. The cores 33 of the solenoid coils 15 are formed of laminated material in the usual manner, and the several cores are insulated from each other by the insulating blocks 16.

The poise 31, adapted to be automatically moved relatively to the scale beam, comprises a solenoid coil 34 arranged to surround the arm of the scale beam composed of the solenoid coils 15, the solenoid poise being carried upon suitable anti-friction rollers resting upon the several conducting strips of the scale beam, which also serve as current conducting mediums for energizing the solenoid 34 as hereinafter described. The forward and rear surface of the solenoid poise 31 is covered with insulating blocks, from one of which depends the index or pointer 30 arranged to move over the graduated face of the lower rod 29. One end of the wire forming the solenoid coil 31 is connected to the bracket 35 carrying the anti-friction roller 36 (see Fig. 2) which is adapted to rest upon the longitudinal strip $d$ above referred to, which is connected to one end of the wires forming each of the solenoid coils 15 of the beam. The other end of the wire forming the solenoid poise 31 is connected to the bracket 37 carrying the anti-friction roller 38 which is adapted to rest upon the longitudinal conducting strip $c$, which is suitably connected with the batteries or other source of current to act as a feed strip, substantially as hereinafter set forth.

A pair of selector strips $b$ and $e$ of conducting material are arranged on opposite sides of the upper portion of the scale beam (see Figs. 3 and 5) and are connected respectively with the upper and lower contact pieces 24 and 25 carried upon the nose 23 of the scale beam, and are engaged by the anti-friction rollers 39 and 41 respectively carried by the brackets 40 and 42, see Figs. 2 and 4, arranged at opposite ends of the solenoid poise 31. The bracket 40 carrying the roller 39 resting upon the conducting strip $b$, see Fig. 2, is suitably connected, as by means of the wire 43, with the bracket 44 carrying the anti-friction roller 45 arranged at the forward face of the solenoid poise and adapted to rest upon the several conducting members 32 forming the commutator strip 2. The bracket 42 carrying the anti-friction roller 41 resting upon the conducting strip $e$, see Fig. 4, is suitably connected, as by means of the wire 46, with the bracket 47 carrying the anti-friction roller 48 arranged at the rear face of the solenoid poise 31 and similarly resting upon the several conducting members 32 forming the commutator strip $a$.

In the operation of the scale, the solenoid poise 31 when suitably energized will, in accordance with the well-known action of solenoids, be attracted to or repelled from that solenoid coil 15 of the scale beam adjacent the poise that is energized by the transmission of the electric current, and the anti-friction members 45 and 48 carried upon the forward and rear surfaces respectively of the poise are so arranged with relation to the conducting members 32 of the commutator strip *a* that when the poise is moved along the scale beam by virtue of such attraction or repulsion either the roller 45 or the roller 48 according to the direction of movement will be advanced to close the circuit through a second coil 15 of the scale beam, so that a second attraction or repulsion will be effected, the movement of the poise by virtue of this second attraction or repulsion advancing the roller 44 or 48 to close the circuit through a third coil 15 of the scale beam, and so on until the desired point upon the scale beam is reached by the traveling poise to counter-balance or offset the load upon the scale platform.

The anti-friction roller 45, as is clearly shown in Fig. 1, is arranged upon the forward surface of the poise 31, and is utilized to transmit the current during the advance movement, or movement away from the fulcrum point 10 along the scale beam, while the anti-friction roller 48 is arranged upon the rear surface of the poise 31 and is used to transmit the current during the return movement, or movement toward the fulcrum point 10 along the scale beam.

It will be apparent, therefore, that to secure a movement of the poise in one direction a circuit must be formed whereby the current will be transmitted through the anti-friction roller 45, while to secure a movement of the poise in the opposite direction a circuit must be closed to transmit the current through the opposite anti-friction roller 48.

Assuming now that the poise 31 is in its normal position adjacent the fulcrum point 10 of the scale beam with its index 30 pointing to zero on the graduated rod 29, when an article is placed on the scale platform the scale beam 9 will be rocked by the pull exerted upon the hook-rod 7 and U-shaped yoke 8 to bring the upper contact piece 24 upon the nose of the scale beam into engagement with the upper contact screw 26, completing the circuit to advance the traveling poise 31 in a forward direction, or away from the fulcrum of the beam.

The circuit whereby the solenoid 31 will be advanced from its normal position adjacent the fulcrum point 10 of the scale as above described is as follows: Beginning with the plug P connected to the source of current the circuit leads through the wire 54 to the insulated screw 55 and the bracket 28 carrying the upper contact screw 26 to the contact piece 24 moved upwardly by this rocking of the beam into engagement with the upper contact screw 26, through the wire 50 to the selector bar *b* on which rests the anti-friction roller 39, (see Fig. 2), the circuit continuing from this roller 39 and its bracket 40 through the wire 43 to the uppermost bracket 44 whose anti-friction roller 45 contacts with the commutator strip *a*. The particular contact member 32 then in contact with the roller 45 will then transmit the current to the wire forming the particular solenoid coil 15 directly below it, through said coil to the longitudinal contact strip *d* secured to its opposite end, upon which bar *d* rests the roller 36 to whose bracket 35 is connected one end of the wire forming the solenoid poise 31, thence through the solenoid poise 31 to the roller 38, to whose bracket 37 is connected the other end of the wire forming the solenoid poise 31. The roller 38 rests upon the longitudinal conducting strip *c*, and this strip is connected to the plug P and the source of current by means of the wire 51 leading from the strip *c* to the supporting member 13, thence through the bracket 11, the insulated screw 52 and wire 53 to the plug P.

The transmission of the current upon the completion of this circuit when the contact piece 24 engages the contact screw 26 serves to energize the solenoid poise 31 and the solenoid coil 15 of the scale beam immediately in advance of the position of the poise 31 upon whose contact member 32 the roller 45 rests, whereupon the poise 31 will be attracted toward a position wherein its center of mass will coincide with the center of mass of the solenoid coil 15 then energized, this advance movement, however, carrying the roller 45 into engagement with the contact member 32 of the coil 15 next in line with the solenoid coil 15 then energized so that the current will be directed through this next adjacent contact coil 15 and the poise 31, serving to attract the poise 31 toward a new position wherein its center of mass coincides with the center of mass of this second coil 15, the second advance movement again carrying the roller 45 into contact with the next adjacent contact member 32 of the commutator strip *a* to again complete the circuit through a new solenoid coil 15, and so on until the poise 31 approaches a position on the beam counter-balancing the load upon the scale platform, whereupon the scale beam falls, separating the contact piece 24 from the contact screw 26 and breaking the circuit.

Should the momentum of the poise 31 carry it beyond the counter-balancing point, the beam will continue to fall until the lower contact piece 25 engages the lower contact screw 27 carried by the bracket 28, a circuit then being completed whereby the poise 31 is energized to return it toward the counter-balancing point, or in the reverse direction of movement from its movement in advancing toward the counter-balancing point. This circuit includes the wire 54, bracket 28 carrying the lower contact screw 27, the contact piece 25, the wire 56 leading from the contact piece 25 to the selector strip $e$, the anti-friction roller 41 resting on said selector strip, the bracket 42 supporting said roller 41 and the wire 46 connecting the bracket 42 with the bracket 47 carrying the anti-friction roller 48 (arranged at the opposite end of the poise 31 from the roller 45 and, like the roller 45, in contact with the commutator strip $a$). From the roller 48 the current passes through the particular contact member 32 then in engagement with the roller 48 and the solenoid coil 15 connected to this particular contact member to the longitudinal strip $d$ (which is connected to one end of all of the solenoid coils 15), thence through the strip $d$ to the roller 36 and bracket 35 to and through the solenoid poise 31 and the bracket 37 and the roller 38 to the conducting strip $c$, the remainder of the circuit being substantially the same as that employed to advance the poise as above described. As the poise in its return travel approaches the counter-balancing point the beam rises, separating the contact piece 25 from the lower contact screw 27 and breaking the circuit. Should it happen that the momentum of the poise again carried it beyond the counter-balancing point, the beam in rising will again bring the contact piece 24 into engagement with the upper contact screw 26, again closing the circuit advancing the poise, this alternate advance and recession of the poise continuing until the exact point of equilibrium is reached.

As soon as the load is removed from the platform of the scale the beam will fall closing the circuit through the lower contact piece 25 and contact screw 27 to return the poise to its normal position wherein the beam is balanced so that neither the contact screws 26 or 27 are engaged by the nose of the beam.

From the above it is believed to be apparent that means are provided for automatically advancing the poise toward and to a counter-balancing position to offset a load placed upon the scale platform and to automatically return the poise to its normal position after the load has been removed from the scale platform, the means for automatically moving the poise 31 in one direction or the other always including a portion of the commutator strip $a$, the conducting strip $d$ and the conducting strip $c$, and one of the pair of selector strips $b$ and $e$, the particular one of said strips to be employed being determined by the position of the nose 23 of the scale beam in its up and down movements, the selector strip $b$ being employed whenever the circuit is completed through the engagement of the upper contact piece 24 and the contact screw 26, at which time the poise is advanced, and the other selector strip $e$ being employed when the lower contact piece 25 engages the contact screw 27, at which time the poise is moved in a return direction or toward the fulcrum point 10 of the scale beam.

In the modification shown in Figs. 6–14 inclusive a scale beam is employed having a portion thereof formed of a longitudinally arranged series of separated coils $15^a$ surrounded by a traveling poise formed of a solenoid coil $31^a$, substantially as shown. In this modification the scale beam comprises a central beam formed of a series of solenoid coils $15^a$ insulated from each other by rings $16^a$ of fiber, rubber or other insulating material, the end coils of the series being respectively secured to the end blocks 101 and 102 of insulating material, the nose 103 of the scale beam extending from the block 101 substantially in alinement with the series of coils $15^a$.

The upper portion of the blocks 101 and 102 are connected by an upper conducting rod 104 arranged to act as a common feed wire as hereinafter set forth, and adjacent their lower portions the blocks 101 and 102 are connected by a pair of lower conducting rods 105 and 106, one or the other of which is adapted to be employed for conducting the current in the operation of the scale, the lower bars 105 and 106 being in this respect the equivalents of the selector strips $b$ and $e$ employed in the modification shown in Figs. 1–5. Between the conducting rods 105 and 106 and adjacent the lower portions of the blocks 101 and 102 is located a commutator 107 formed of a longitudinal series of separated rings 108 insulated from each other and each connected respectively with a certain one of the series of solenoid coils $15^a$ of the upper beam, the several sections 108 of the commutator being respectively connected with the several solenoid coils $15^a$ by means of wires arranged according to the diagrams shown in Figs. 12, 13, and 14, the arrangement being in the modification herein shown that the end of the wire leading from the commutator section 108 adjacent the end of the series nearest the end piece 102 is connected with the binding post 1 (see Figs. 11 and 12), and the wire leading from the solenoid coil $15^a$ adjacent the same end of the beam is likewise connected to this same binding post 1, the wires leading from the next adjacent commutator section 108 and the next solenoid coil $15^a$ being secured to the same binding post 2, the wires from the next commutator section 108 and solenoid coil $15^a$ of the respective series being connected to the same binding post 3, and so on, so that each solenoid coil $15^a$ of the scale beam is energized through the wire leading from and connected to the commutator section 108 arranged directly below it.

When it is desired to indicate the weights of articles weighed upon the scale at a distance from the scale proper, this connection of wires from the coils 15ª and the commutator section is of value. For example an indication showing five pounds upon a suitable indicator could be connected to the wires 5ª leading to the binding post 5 from the commutator section 108 and that solenoid coil 15ª on the scale beam energized by the transmission of the electric current when the poise 31ª is in position on the scale beam to counter-balance 5 lbs. upon the scale platform. In the indicating mechanisms illustrated in Figs. 9 and 10 an electric lamp is arranged behind a circular and longitudinal series respectively of transparent or translucent plates bearing respectively the numerals corresponding to the weights of articles that may be weighed on the scale illustrated in Fig. 6, wherein the capacity as shown is limited to 15 lbs., and conducting wires are led from the binding post 1 to the lamp directly behind the plate bearing the numeral 1 in each of the series of indications employed, conducting wires are led from the binding post 2 to the lamp behind the plates bearing the numeral 2, from the binding post 3 to the lamp behind the plates bearing the numerals 3 and so on; a separate pair of conducting wires being provided for illuminating the lamps behind the plates bearing the same numerals in the several series, these wires being connected with the particular solenoid coil 15ª and commutator section 108 energized when the poise 31ª is located upon the scale beam in position to counterbalance a load upon the scale platform corresponding in weight to the numeral on the plate illuminated by these particular lamps. In the illustrated embodiment the lamps behind the numeral 5 are illuminated as shown in Figs. 9 and 10 when the poise 31ª is in the position shown in Fig. 6, wherein a counter-balancing position has been reached to offset a load of 5 lbs. on the scale platform, the conducting wires 5ª extending from the respective solenoid coil 15ª and commutator section 108 adjacent the numeral 5 on the graduated rod 109 carried upon the lower portion of the scale beam.

The scale beam shown in Fig. 6 may be pivoted intermediate its ends upon the bracket 11 carried upon the crossbar 12 of the framework of the scale substantially as in the modification illustrated in Fig. 1 and is similarly rocked upon the imposition of a load upon the scale platform through the hook-rod 7 and U-shaped yoke 8 bearing upon the knife-edge bearings carried by the short arm of the scale. This arm of the scale also carries an adjustable supporting member 19ª for the reception of the sealing weight 20ª. Secured to the end pieces 101 and 102 and arranged in position to coöperate with an index or pointer 30ª carried upon the movable poise 31ª is a graduated rod 109, the forward face of which is appropriately graduated for pounds and ounces in any desired manner. Secured to, but insulated from the crossbar 12 of the framework of the scale is a bracket 28ª carrying a loop 128 in the arms of which are secured upper and lower contact screws 26ª and 27ª respectively arranged in the path of contact of the nose 103 of the scale beam, which carries upper and lower contact pieces 24ª and 25ª respectively adapted to engage the upper and lower contact screws during the operation of the scale as hereinafter described. The upper contact piece 24ª is electrically connected, as by means of the wire 111, with the longitudinal conducting rod 106 (see Fig. 8), and the lower contact piece 25ª is electrically connected, as by means of the wire 112, with the opposite conducting rod 105. The upper and lower contact screws are both secured upon the same bracket 28ª, which is electrically connected with the batteries or other source of current, as by means of the wire 113, see Fig. 6.

The movable poise 31ª comprises a solenoid coil 34ª surrounding the longitudinal series of solenoid coils 15ª of the beam, an upright bracket 114 being secured to the end pieces of the solenoid poise and carries anti-friction rollers 115 bearing upon the longitudinal conducting rod 104 to suspend the poise in position with the coil thereof out of contact with the beam coils 15ª. The pointer or index 30ª is suitably secured to the end pieces of the poise as shown in Fig. 6. One end of the wire forming the solenoid coil 34ª of the poise is connected, as by means of the wire 116, with the bracket 114 carrying the anti-friction rollers 115, and the opposite end of the wire forming the poise solenoid is connected to the anti-friction roller 117 suitably mounted upon the lower portion of the poise in position to engage the longitudinal contact rod 118 arranged immediately beneath the series of solenoid coils 15ª of the beam, to which conducting strip 118 one end of the wires forming each of the solenoid coils 15ª is connected. As clearly shown in Figs. 6 and 13 brushes 119 and 120, which may be formed of curved spring metal or other suitable material, are carried by the opposite end pieces of the poise 31ª in position to bridge the space between the commutator 107 and the lower conducting rods 105 and 106, the brush 119 upon one end of the poise lightly contacting with the rod 105 and the commutator, and the brush 120 carried by the opposite end of the poise lightly contacting with the rod 106 and the commutator. By securing the brushes upon the opposite ends of the poise, provision is made whereby during the travel of the poise relatively to the scale beam as hereinafter described, the brush 119 or the brush 120 will be advanced ahead of the poise during its forward and return movements so as to complete the circuit energizing the poise through different sections of the commutator.

In the operation of the scale, whenever a load is placed upon the scale platform the beam will be rocked so as to bring the upper contact plate 24$^a$ into engagement with the upper contact screw 26$^a$ and a circuit is completed whereby the poise 31$^a$ will be advanced or moved in a direction away from the fulcrum of the beam, while whenever the poise 31$^a$ has moved to a position beyond the counter-balancing point or whenever the load is removed from the scale platform the beam will fall completing a circuit through the lower contact screw 27$^a$ and the lower contact piece 25$^a$ to move the poise in the opposite direction.

Assuming now that the poise 31$^a$ is in its normal position adjacent the fulcrum point 10 of the beam with the pointer 30$^a$ pointing to zero on the graduated rod 109, when an article is placed upon the scale platform the beam is rocked to bring the upper contact piece 24$^a$ into contact with the upper contact screw 26$^a$, completing the circuit to advance the poise in a forward direction, this circuit including the wire 113 leading from the batteries or other source of current, the bracket 28$^a$, contact screw 26$^a$, contact piece 24$^a$, wire 111 connecting the contact piece with the longitudinal conducting rod 106, the rod 106 and the brush 120, these several conducting members leading the current into the section 108 of the commutator 107 then in contact with the brush 120. The current is then led from this commutator section 108 (which when the poise is in its normal position is the section nearest to the end piece 102 of the beam) through the wire connecting this commutator section with the solenoid coil 15$^a$ adjacent the end piece 102 of the beam, through this solenoid coil to the conducting strip 118 to which the opposite end of all the beam coils 15$^a$ is connected, thence through the roller 117 to and through the solenoid poise 31$^a$, the bracket 114 and rollers 115 to the upper longitudinal conducting rod 104, which is appropriately connected, as by means of the wire 123, with the batteries or other source of current. Upon the completion of the circuit through the conducting members above described the solenoid poise 31$^a$ is energized, as is that solenoid coil 15$^a$ carried by the beam adjacent the end piece 102 (which coil 15$^a$ is surrounded by the poise 31$^a$ when the poise is in its normal position) and the direction of flow of the current will so influence the polarity of the two energized coils that in the embodiment herein illustrated the movable poise 31$^a$ will be repelled from the stationary coil 15$^a$ according to the well-known action of solenoids, the movement of the poise when so repelled advancing the brush 120 into a position wherein it contacts with the next adjacent section 108 of the commutator, completing the circuit through said commutator section and the second coil 15$^a$ of the series of coils upon the beam, which second coil would, at the moment of energization, be surrounded by the poise 31$^a$. Immediately upon the completion of the circuit through the second solenoid coil 15$^a$ as above described the poise 31$^a$ will be again repelled along the scale beam and in its movement will again advance the brush 120 to complete the circuit through the next adjacent commutator section 108 and the next, or third, coil 15$^a$ of the beam, whereupon a further repulsion and movement of the poise 31$^a$ will be effected, and so on until the poise 31$^a$ approaches the position upon the scale beam counter-balancing the load upon the scale platform and causes the beam to fall, separating the contact piece 24$^a$ from the upper contact screw 26$^a$ and breaking the circuit.

Should the momentum of the poise 31$^a$ carry it beyond the counter-balancing point, the beam will continue to fall until the lower contact piece 25$^a$ engages with the lower contact screw 27$^a$, a circuit then being completed whereby the poise 31$^a$ is energized to return it toward the counter-balancing point. This circuit includes the wire 113 leading from the source of current, the bracket 28$^a$, contact screw 27$^a$, contact piece 25$^a$, wire 112 connecting the contact piece 25$^a$ with the longitudinal conducting rod 105, the rod 105 and the brush 119, which conducting members are employed to lead the current into the commutator section 108 then in contact with the brush 119, the circuit then continuing through this commutator section 108 to and through the solenoid coil 15$^a$ connected to this particular commutator section to the longitudinal conducting strip 118, thence through the roller 117, the solenoid poise 31$^a$, the bracket 114 and the rollers 115 to the upper conducting rod 104, thence returning by the wire 123 to the source of current. Upon the completion of this circuit the coil 15$^a$ directly above the commutator section 108 then in contact with the brush 119 will be energized (which coil as may be seen in Fig. 6 is partially surrounded by the solenoid poise 31$^a$), and the energization of this coil will serve to repel the poise 31$^a$ in a direction toward the fulcrum of the beam, the movement of the poise when so repelled carrying the brush 119 into contact with the next commutator section 108 to energize the next adjacent solenoid coil 15$^a$, whereupon the circuit is completed through this newly energized solenoid coil 15$^a$ and the poise 31$^a$ is again repelled toward the fulcrum of the beam, this repulsion of the poise continuing until it approaches the counter-balancing point and the beam rises separating the contact piece 25<sup>a</sup> and the contact screw 27<sup>a</sup>.

Should the momentum of the poise again carry it beyond the counter-balancing point, the beam in rising will again bring the contact piece 24<sup>a</sup> into engagement with the upper contact screw 26<sup>a</sup> again closing the circuit to advance the poise, this alternate advance and recession of the poise continuing until the exact point of equilibrium is reached.

As soon as the load is removed from the platform of the scale the beam will fall, closing the circuit through the lower contact piece 25<sup>a</sup> and contact screw 27<sup>a</sup> to return the poise to its normal position wherein the beam is balanced so that neither of the contact screws 26<sup>a</sup> or 27<sup>a</sup> are engaged by the nose of the beam.

It will be apparent that either the principle of attraction of one solenoid for another by the flow of current in certain directions, or the principle of repulsion exerted between the two due to the flow of current in the opposite direction may be utilized in connection with this invention. By way of example the scale shown in Figs. 1–5 inclusive has been wired so that the principle of attraction is utilized and the modification illustrated in Figs. 6–14 inclusive has been wired to utilize the principle of repulsion in a scale of this character. The polarity of either of these modifications might, however, be changed so as to utilize the opposite principle therein.

In Fig. 14 is shown a diagrammatic view of the wiring principle used in the scale illustrated in Figs. 6–14 inclusive, the several commutator sections being respectively connected to the solenoid coils 15<sup>a</sup> directly above them, and the opposite end of the wires forming each of the coils 15<sup>a</sup> being connected with the conducting strip 118, the circuit thence being indicated as through the solenoid poise 31<sup>a</sup> to the upper conducting rod 104 and the source of current, the wires leading from the source of current toward the commutator sections being divided so that when the upper contact piece 24<sup>a</sup> is utilized in conducting the current the circuit is completed through the wire 111 and the conducting rod 106 to the commutator sections, while when the lower contact piece 25<sup>a</sup> is utilized, the current is completed through the wire 112 and the conducting rod 105.

It is to be understood that the specific mechanisms herein shown for accomplishing the several purposes mentioned are illustrated only by way of exemplification and that many other forms, modifications and variations may be resorted to without departing from the spirit and scope of my invention, which is defined in the claims hereinafter set forth in such terms as to distinguish it from the prior art so far as known to me, though it is not my intention to relinquish or abandon any portion of the invention.

Having described my invention, I claim:

1. In a scale, a goods-receiver, a scale beam comprising a series of coils of wire, connections between the scale beam and goods-receiver and a poise movable over said coils by the inductive force exerted by the coils.

2. In a scale, a goods-receiver, a scale beam comprising a series of coils of wire, insulating strips spacing said coils from each other, connections between the scale beam and goods-receiver, means for energizing said coils, and a poise automatically movable relatively to said coils by the inductive force exerted by the coils.

3. In a scale, a goods-receiver, a scale beam comprising a series of solenoid coils arranged adjacent each other, insulating spacers between said coils, connections between the scale beam and goods-receiver, means for energizing said coils, and a poise coöperating with said coils by the inductive force exerted by the coils.

4. In a scale, a goods-receiver, a scale beam comprising a series of solenoid coils arranged adjacent each other, insulating spacers between said coils, connections between the scale beam and goods-receiver, and a poise automatically movable relatively to and coöperating with said coils by the inductive force exerted by the coils.

5. In a scale, a goods-receiver, a scale beam comprising a series of electric mechanisms arranged adjacent each other, insulating spacers between said mechanisms, connections between the scale beam and goods receiver, means for energizing said mechanisms, and a poise including an electric mechanism movable relatively to and coöperating with said beam mechanisms by the inductive force exerted by the beam mechanisms.

6. In a scale, a goods-receiver, a scale beam comprising a series of electro-magnetic mechanisms arranged adjacent each other, insulating spacers between said mechanisms, connections between the scale beam and goods-receiver, means for energizing said mechanisms, and a poise including an electric mechanism movable relatively to and coöperating with said beam mechanisms by the inductive force exerted by the beam mechanisms.

7. In a scale, a goods-receiver, a scale beam comprising a series of electric mechanisms arranged adjacent each other, insulating spacers between said mechanisms, connections between the scale beam and goods-receiver, means for energizing said mechanisms including contacts adjacent the scale beam, and a poise including an electric mechanism movable relatively to and coöperating with said beam mechanisms by the inductive force exerted by the beam mechanisms, the direction of movement of the poise being controlled by the movement of the beam.

8. In a scale, a goods-receiver, a scale beam comprising a series of electro-magnetic mechanisms arranged adjacent each other, insulating spacers between said mechanisms, connections between the scale beam and goods-receiver, means for energizing said mechanisms including contacts adjacent the scale beam, and a poise including an electric mechanism movable relatively to and coöperating with said beam mechanisms by the inductive force exerted by the beam mechanisms, the direction of movement of the poise being controlled by the movement of the beam.

9. In a scale, a goods-receiver, a scale beam comprising a series of solenoid coils arranged adjacent each other, insulating spacers between said coils, connections between the scale beam and goods-receiver, means for energizing said coils including contacts adjacent the scale beam, and a poise movable relatively to and coöperating with said coils by the inductive force exerted by the coils, the direction of movement of the poise being controlled by the movement of the beam.

10. In a scale, a goods-receiver, a scale beam comprising a series of electric mechanisms arranged adjacent each other in longitudinal alinement, insulating spacers between said mechanisms, connections between the scale beam and goods-receiver, means for energizing said beam mechanisms, and a poise including an electric mechanism movable relatively to and coöperating with said mechanisms by the inductive force exerted by the beam mechanisms.

11. In a scale, a goods-receiver, a scale beam comprising a series of electro-magnetic mechanisms arranged adjacent each other in longitudinal alinement, insulating spacers between said mechanisms, connections between the scale beam and goods-receiver, means for energizing said mechanisms including contacts adjacent the scale beam, and a poise including an electric mechanism movable relatively to and coöperating with said beam mechanisms by the inductive force exerted by the beam mechanisms, the direction of movement of the poise being controlled by the movement of the beam.

12. In a scale, a goods-receiver, a scale beam comprising a series of separated solenoid coils, connections between the scale beam and goods-receiver, means for energizing said coils and a poise comprising a solenoid coil movable relatively to and coöperating with the coils of the scale beam.

13. In a scale, a goods-receiver, a scale beam comprising a series of electro-magnetic mechanisms insulated from each other, connections between the scale beam and goods-receiver, a poise comprising an electro-magnetic mechanism arranged to move relatively to the scale beam, and means for energizing the poise and successive mechanisms of the scale beam to move the poise along the beam.

14. In a scale, a goods-receiver, a scale beam comprising a series of solenoid coils insulated from each other, connections between the scale beam and goods-receiver, a poise comprising a solenoid coil arranged to move relatively to the scale beam, and means for energizing the poise and successive coils of the scale beam to move the poise along the beam.

15. In a scale, a goods-receiver, a scale beam comprising a series of electro-magnetic mechanisms insulated from each other, connections between the scale beam and goods-receiver, a poise comprising an electro-magnetic mechanism arranged to move relatively to the scale beam, and means for energizing the poise and a single electro-magnetic mechanism of the beam to move the poise a portion of the distance along the beam, the several electro-magnetic mechanisms of the beam being connected and arranged to be successively energized to effect the movement of the poise along the entire beam.

16. In a scale, a goods-receiver, a scale beam comprising a series of solenoid coils insulated from each other, connections between the scale beam and goods-receiver, a poise comprising a solenoid coil arranged to move relatively to the scale beam, and means for energizing the poise and a single solenoid coil of the beam to move the poise a portion of the distance along the beam, the several solenoid coils of the beam being connected and arranged to be successively energized to effect the movement of the poise along the entire beam.

17. In a scale, a goods-receiver, a scale beam comprising a series of electro-magnetic mechanisms insulated from each other, connections between the scale beam and goods-receiver, a poise comprising an electro-magnetic mechanism arranged to move relatively to the scale beam, and means for energizing the poise and successive mechanisms of the scale beam to move the poise along the beam including spaced contacts in the path of the scale beam whereby the extent and direction of movement of the poise are controlled by the movement of the scale beam.

18. In a scale, a goods-receiver, a scale beam comprising a series of solenoid coils insulated from each other, connections between the scale beam and goods receiver, a poise comprising a solenoid coil arranged to move relatively to the scale beam, and means for energizing the poise and successive coils of the scale beam to move the poise along the beam, including spaced contacts in the path of the scale beam whereby the extent and direction of movement of the poise are controlled by the movement of the scale beam.

19. In combination, a goods-receiver, a scale beam comprising a series of solenoid coils, insulating spacers arranged between said coils, connections between the scale beam and goods-receiver, means for energizing said coils, a poise automatically movable relatively to and coöperating with said coils by the inductive force exerted by the coils, and means for indicating the movement of the poise relatively to the scale beam at a distance from the scale proper.

20. In combination, a goods-receiver, a scale beam comprising a series of electric mechanisms, insulating spacers arranged between said mechanisms, connections between the scale beam and goods-receiver, means for energizing said mechanisms, a poise automatically movable relatively to and coöperating with said mechanisms by the inductive force exerted by the beam mechanisms, and means for indicating the movement of the poise relatively to the scale beam at a distance from the scale proper.

21. In combination, a goods-receiver, a scale beam comprising a series of electro-magnetic mechanisms, insulating spacers arranged between said mechanisms, connections between the scale beam and goods-receiver, means for energizing said mechanisms, a poise automatically movable relatively to and coöperating with said mechanisms by the inductive force exerted by the beam mechanisms, and means for indicating the movement of the poise relatively to the scale beam at a distance from the scale proper.

22. In combination, a goods receiver, weight-offsetting means for counterbalancing the weight of a commodity placed in said receiver, including a scale beam comprising a series of solenoid coils arranged in longitudinal alinement, connections between the goods-receiver and the scale beam, means for energizing said coils, a poise movable relatively to and coöperating with said solenoid coils by the inductive force exerted by the coils, and means for indicating the weight offset at a distance from the scale proper.

23. In combination, a goods-receiver, weight-offsetting means for counterbalancing the weight of a commodity placed in said receiver including a scale beam comprising a series of electric mechanisms arranged in longitudinal alinement, connections between the goods-receiver and the scale beam, means for energizing said mechanisms by the inductive force exerted by the beam mechanisms, a poise movable relatively to and coöperating with said mechanisms, and means for indicating the weight offset at a distance from the scale proper.

24. In combination, a goods-receiver, weight-offsetting means for counterbalancing the weight of a commodity placed in said receiver including a scale beam comprising a series of electro-magnetic mechanisms arranged in longitudinal alinement, connections between the goods-receiver and the scale beam, means for energizing said mechanisms, a poise movable relatively to and coöperating with said mechanisms by the inductive force exerted by the beam mechanisms, and means for indicating the weight offset at a distance from the scale proper.

25. In a scale, a goods receiver, a scale beam comprising a series of alined electro-magnetic mechanisms, connections between the scale beam and goods-receiver, a series of alined contact members insulated from each other and connected respectively with the electro-magnetic mechanisms, a poise comprising an electro-magnetic mechanism adapted to move relatively to the scale beam and arranged to successively engage said contact members, and means for energizing the poise and that electro-magnetic mechanism of the beam whose contact member is in engagement with the poise to automatically move the poise along the beam.

26. In a scale, a goods receiver, a scale beam comprising a series of alined electro-magnetic mechanisms, a series of alined contact members insulated from each other and connected respectively with the electro-magnetic mechanisms, connections between the scale beam and goods receiver, a poise comprising an electro-magnetic mechanism adapted to move relatively to the scale beam and arranged to successively engage said contact members, and means for energizing the poise and that electro-magnetic mechanism of the beam whose contact member is in engagement with the poise to automatically move the poise along the beam, the direction of movement of the poise being controlled by the position of the scale beam.

27. In a scale, a goods receiver, a scale beam comprising a series of separated solenoid coils, a conducting member connected to all of the solenoid coils, a series of conducting members insulated from each other and each connected to one of said solenoid coils, connections between the scale beam and goods-receiver, a poise movable relatively to the scale beam and adapted to contact said conducting members, and means for energizing the poise and individual coils of the scale beam to move the poise relatively to the beam.

28. In a scale, a goods receiver, a scale beam comprising a series of separated solenoid coils, a conducting member connected to all of the solenoid coils, a series of conducting members insulated from each other and each connected to one of said solenoid coils, connections between the scale beam and goods-receiver, a poise comprising a solenoid coil movable relatively to the scale beam and adapted to contact said conducting members, and means for energizing the poise and individual coils of the scale beam to move the poise relatively to the beam.

29. In an automatic electric scale, a goods-receiver, a scale beam comprising an electric mechanism, a poise comprising an electric mechanism movable relatively to the scale beam, and means for energizing the poise and scale beam to move the former, including a pair of selector bars arranged to be individually employed for conducting the current to the poise and beam, the particular selector bar to be employed being governed by the position of the scale beam.

30. In an automatic electric scale, a goods-receiver, a scale beam comprising a series of electric mechanisms, connections between the scale beam and goods-receiver, a poise comprising an electric mechanism movable relatively to the scale beam, and means for energizing the poise and scale beam to move the former, including a conducting member connected to each of the mechanisms of the beam and a pair of selector bars arranged to be individually employed for conducting the current to the poise and beam, the particular selector bar to be employed being governed by the position of the scale beam.

31. In an automatic electric scale, a goods-receiver, a scale beam comprising a series of electric mechanisms, connections between the scale beam and goods-receiver, a poise comprising an electric mechanism movable relatively to the scale beam, and means for energizing the poise and scale beam to move the former, including a conducting member connected to each of the mechanisms of the beam, a series of conducting members insulated from each other and each connected to one of said electric mechanisms, and a pair of selector bars arranged to be individually employed for conducting the current to the poise and beam, the particular selector bar to be employed being governed by the position of the scale beam.

32. In an automatic electric scale, a goods-receiver, a scale beam comprising a series of solenoid coils, connections between the scale beam and goods-receiver, a poise comprising a solenoid coil movable relatively to the scale beam, and means for energizing the poise and scale beam to move the former, including a conducting member connected to each of the coils of the beam, a series of conducting members insulated from each other and each connected to one of said solenoid coils, and a pair of selector bars arranged to be individually employed for conducting the current to the poise and beam, the particular selector bar to be employed being governed by the position of the scale beam.

SAMUEL G. CRANE.

Witnesses:
H. S. BERGEN,
C. WM. FESSENDEN.